US006799679B2

(12) United States Patent
Hui

(10) Patent No.: US 6,799,679 B2
(45) Date of Patent: Oct. 5, 2004

(54) DISC LOCATOR

(75) Inventor: Yi Ming Hui, Hong Kong (HK)

(73) Assignee: Dragon Plan Limited, Chai Wan (HK)

( * ) Notice: Subject to any disclaimer, the term of this patent is extended or adjusted under 35 U.S.C. 154(b) by 93 days.

(21) Appl. No.: 10/367,745

(22) Filed: Feb. 19, 2003

(65) Prior Publication Data

US 2004/0159563 A1 Aug. 19, 2004

(51) Int. Cl.[7] .............................................. B65D 85/57
(52) U.S. Cl. .................................... 206/308.1; 206/310
(58) Field of Search .............................. 206/308.1, 310, 206/309, 493, 307

(56) References Cited

U.S. PATENT DOCUMENTS 6,425,481 B1 * 7/2002 Choi ....................... 206/308.1
6,427,833 B1 * 8/2002 Hui ............................. 206/310
6,648,135 B2 * 11/2003 Ho ........................... 206/308.1
6,729,469 B1 * 5/2004 Yau et al. ................ 206/308.1

* cited by examiner

Primary Examiner—Jacob K. Ackun, Jr.
(74) Attorney, Agent, or Firm—Leydig, Voit & Mayer, Ltd.

(57) ABSTRACT

A disc locator comprises: a platter, a button located centrally of the platter, a number of inner resilient linkages extending from the button, a number of outer resilient linkages extending from the platter and forming pairs with respective ones of the inner resilient linkages. A number of latches are interposed between some of the inner and outer resilient linkage pairs and each comprise a disc-engaging finger for passing through the central aperture of a disc to retain the disc and are adapted to move toward the button upon depression of the button. Lifting levers are associated with some of the inner and outer resilient linkage pairs and bear upwardly upon a disc upon depression of the button to release the disc.

18 Claims, 8 Drawing Sheets

DISC LOCATOR

BACKGROUND OF THE INVENTION

The present invention relates to disc retaining mechanisms, or "locators" in disc cases. More particularly, although not exclusively, the invention relates to a DVD case having an easy-use disc attachment/release mechanism.

There are many different CD, VCD and DVD cases on the market and many have different types of disc locators. Such locators comprise a button or set of prongs over which the central aperture of the disc is placed to secure the disc to the case. Attachment of the disc is rarely a problem. However, removal of the disc can range from inadvertent to a feat. At one extreme, some poorly designed mechanisms grasp the disc so tightly that the disc must be lifted at its periphery with such force that damage to the disc is risked. At the other extreme, some grasping mechanisms, also of poor design, retain the disc so loosely that it can become dislodged inadvertently, for example, during transportation and postage.

OBJECTS OF THE INVENTION

It is an object of the present invention to overcome or substantially ameliorate at least one of the above disadvantages and/or more generally to provide an improved disc retaining mechanism for DVDs, VCDs, CDs and other discs having a central aperture.

DISCLOSURE OF THE INVENTION

There is disclosed herein a disc locator comprising:
a platter,
a button located centrally of the platter,
a plurality of inner resilient linkages extending from the button,
a plurality of outer resilient linkages extending from the platter and forming pairs with respective ones of the inner resilient linkages,
a plurality of latches interposed between the inner and outer resilient linkages of at least some of said inner and outer resilient linkage pairs, each latch comprising a disc-engaging finger for passing through the central aperture of a disc to retain the disc and adapted to move toward the button upon depression of the button,
a plurality of lifting levers associated with at least some of said inner and outer resilient linkage pairs and adapted to bear upwardly upon a disc to release the disc upon depression of the button.

Preferably the inner resilient linkages are curved and are formed of material thinner than that of the button and platter.

Typically the outer resilient linkages depend from the platter and are formed of material thinner than that of the button and platter.

Preferably alternative inner and outer resilient linkage pairs are associated with said latches.

Preferably alternative inner and outer resilient linkage pairs are associated with said levers.

The lever-associated resilient linkage pairs typically alternate with said latch-associated resilient linkage pairs about the button.

Each latch may comprises a leg from which an inner resilient linkage extends to the button.

Typically, feet extend from the legs and said outer resilient linkages extend from the feet to the platter.

Preferably the legs and feet are formed as a rigid unit.

A pair of feet would typically extend from each leg.

The disc locator might further comprise a plurality of disc positioners and the inner resilient linkage of each lever-associated linkage pair extends from a respective disc positioner to the button.

The disc positioner would typically bear against an inner edge of the disc at its central aperture.

Each lever is generally formed rigidly with a respective disc positioner.

There is further disclosed herein a disc storage case having the above-disclosed disc retainer formed integrally therewith.

BRIEF DESCRIPTION OF THE DRAWINGS

A preferred form of the present invention will now be described by way of example with reference to the accompanying drawings, wherein.

DESCRIPTION OF THE PREFERRED EMBODIMENTS

Figure 1:
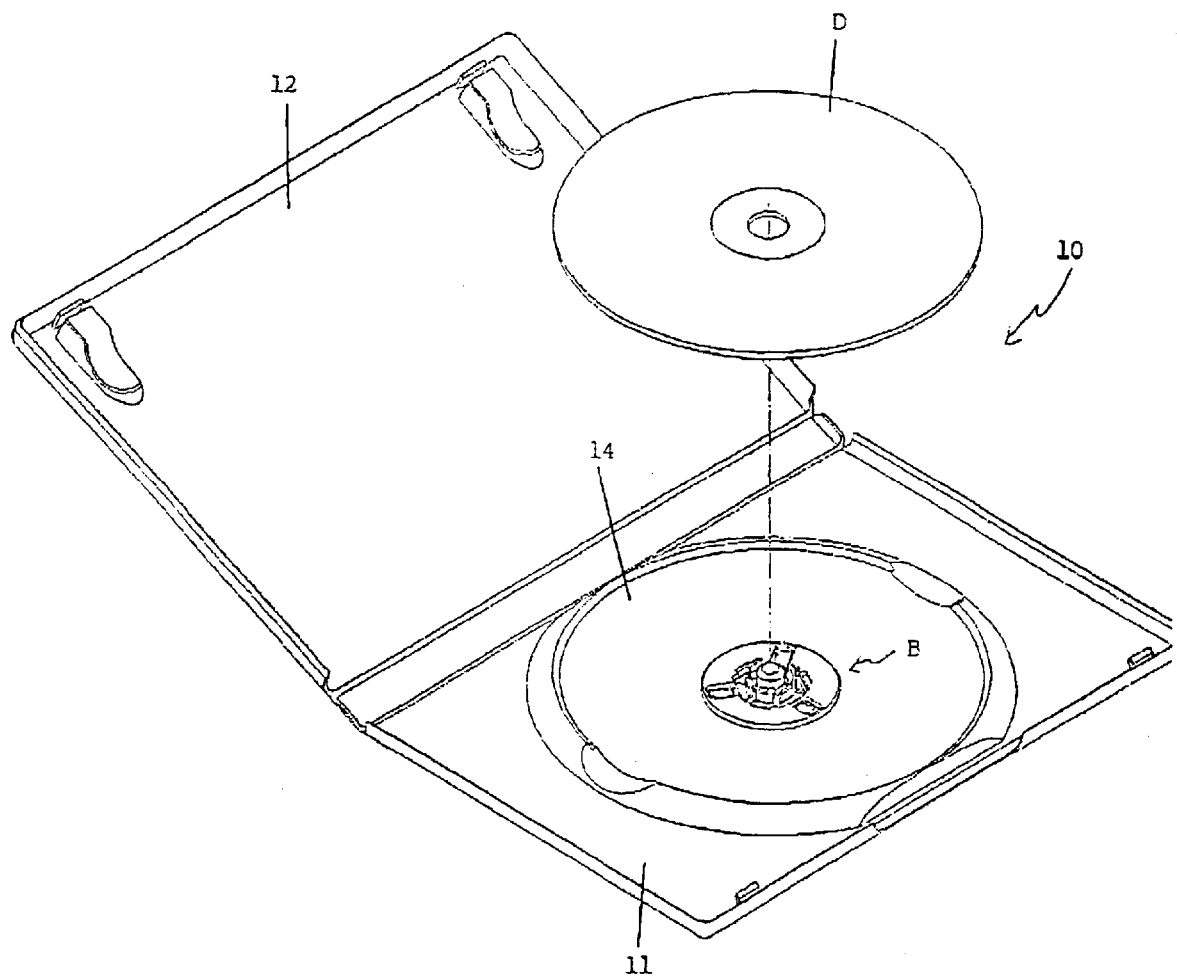
FIG. 1 is a schematic for selective illustration of a DVD storage case and a DVD disc.
Figure 2:
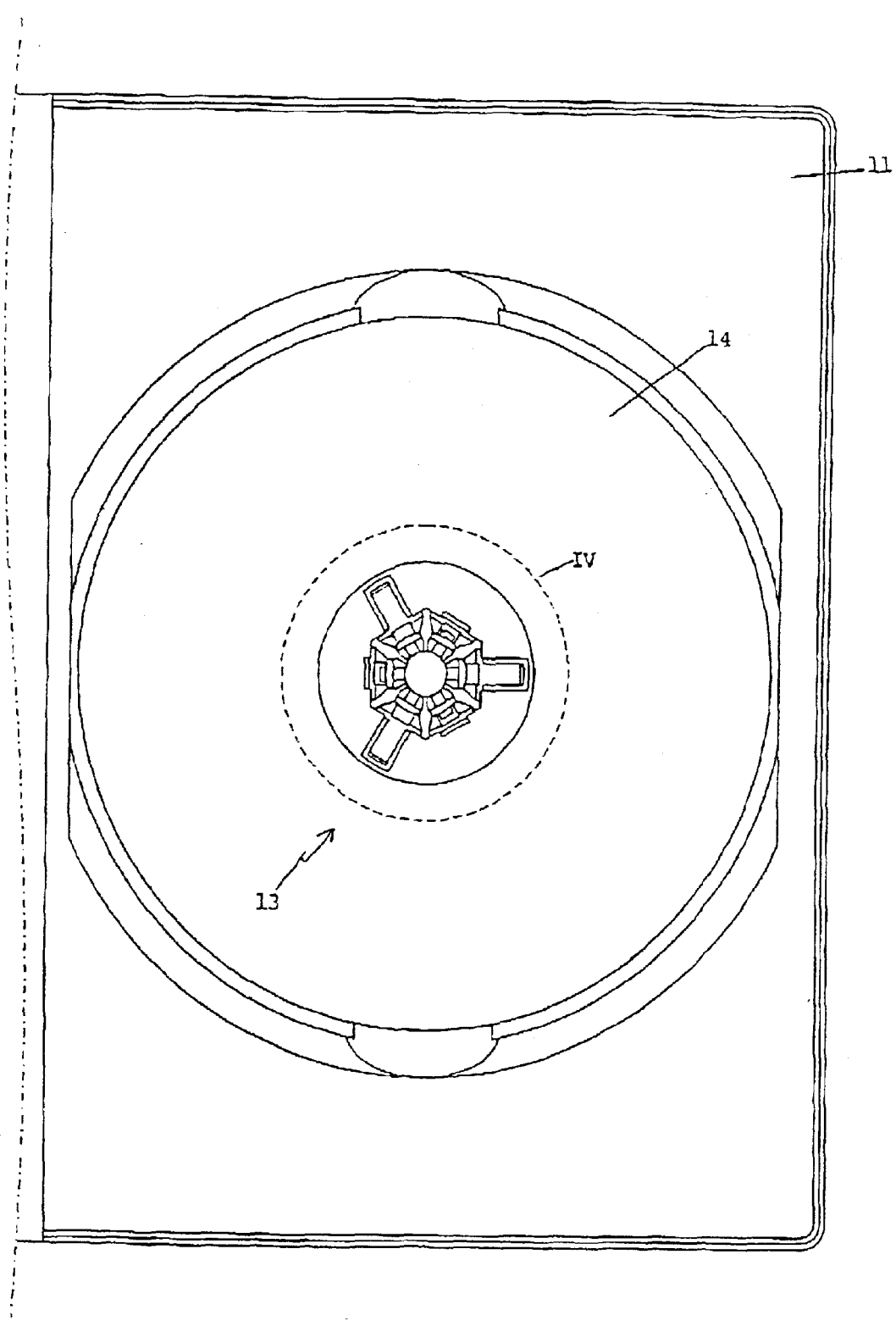
FIG. 2 is a schematic plan view of part of the storage case of FIG. 1.
Figure 3:
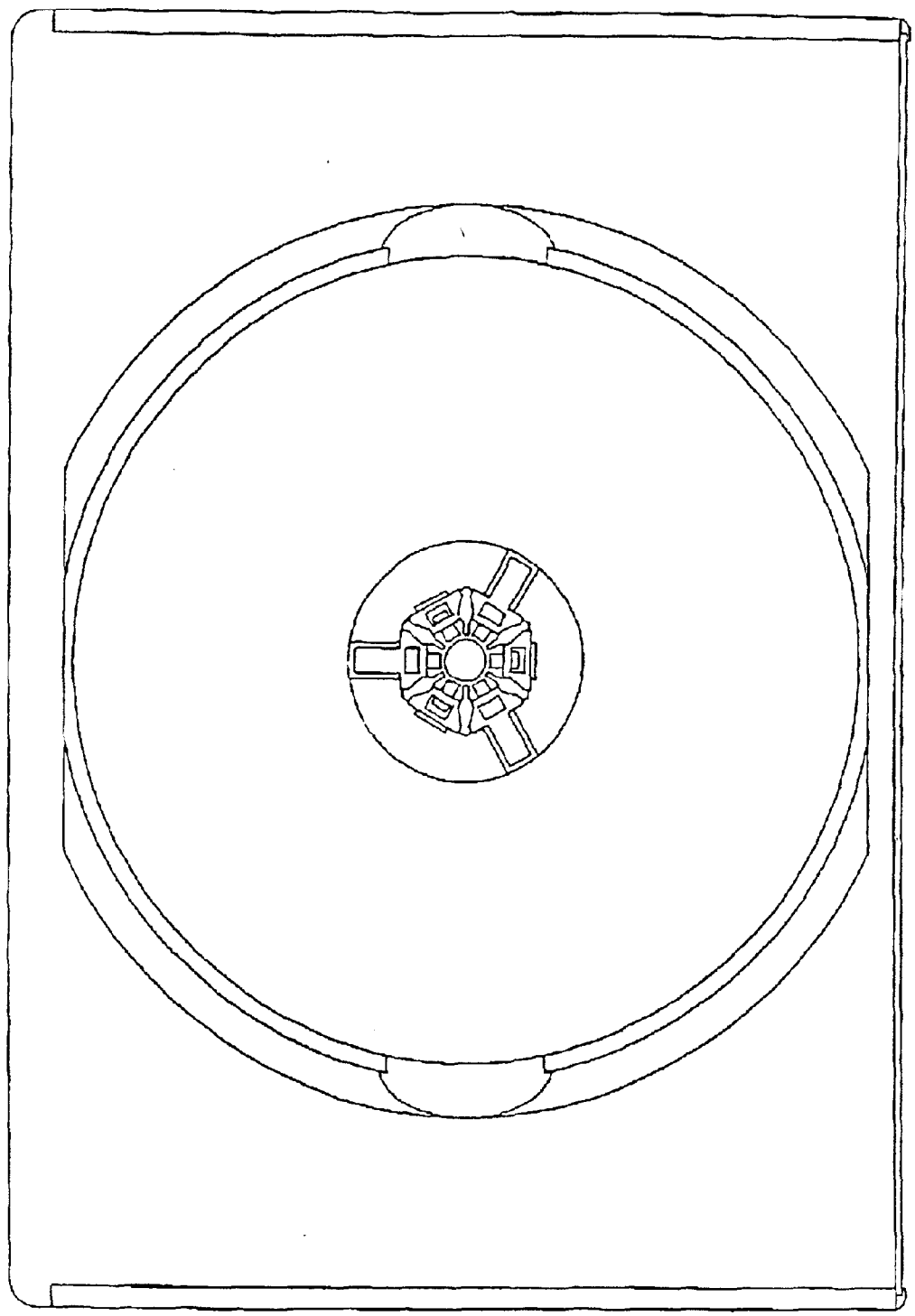
FIG. 3 is a schematic inverted plan view of the opposite side of the part of the storage case shown in FIG. 2.

In the FIGS. 1 to 5 of the accompanying drawings there is depicted schematically a disc storage case 10 fabricated from resilient plastics material. The case 10 includes a base 11 and a lid 12. The base 11 includes a disc locator 13 at the centre of a disc-receiving bay 14.

Figure 4:
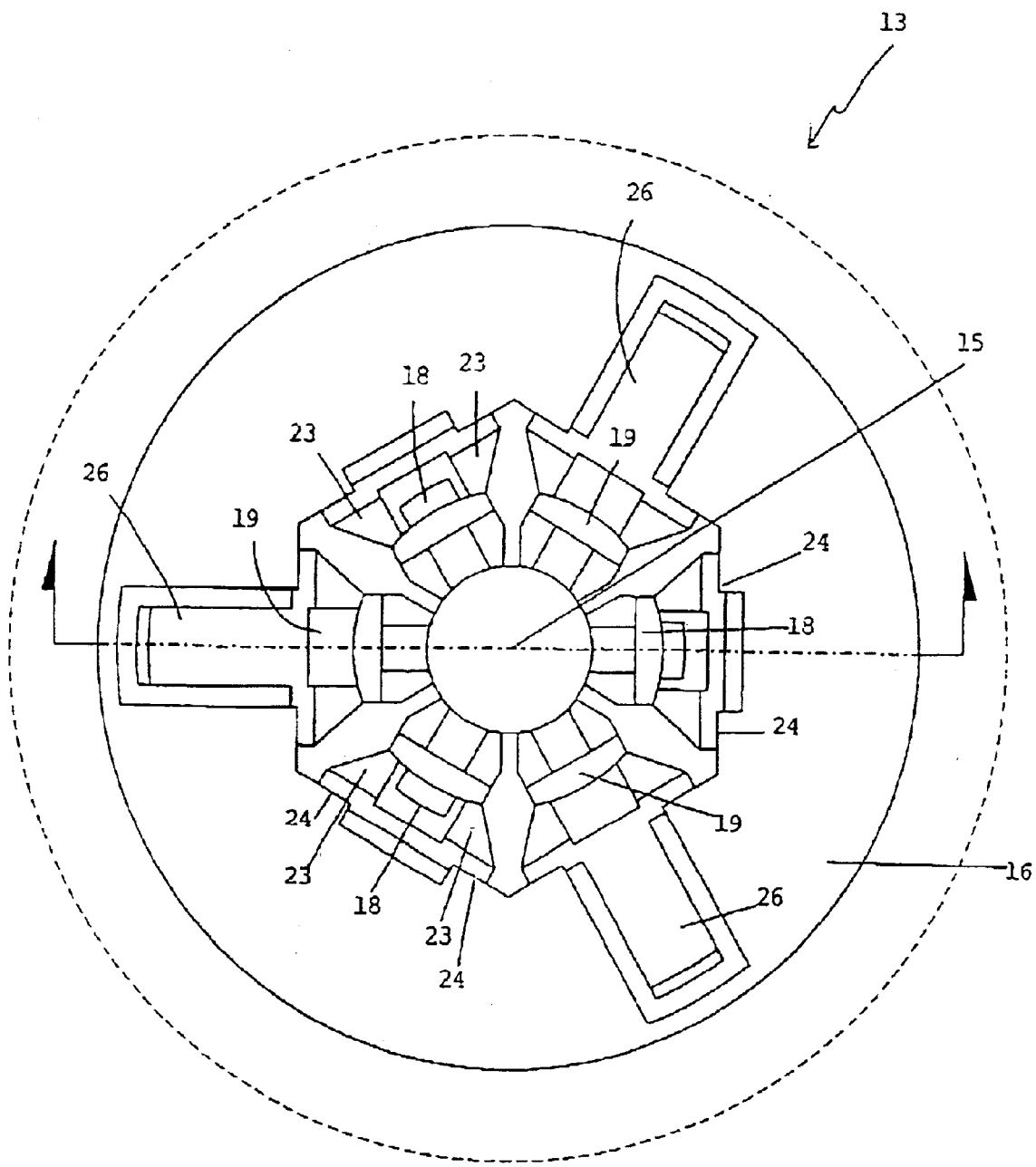
FIG. 4 is a schematic plan view of the disc retaining mechanism shown at IV in FIG. 2, FIGS. 5A and 5B are schematic cross-sectional elevational views of the mechanism of FIG. 4 shown in disc-retaining and the disc-release configurations respectively.
Figure 5A:
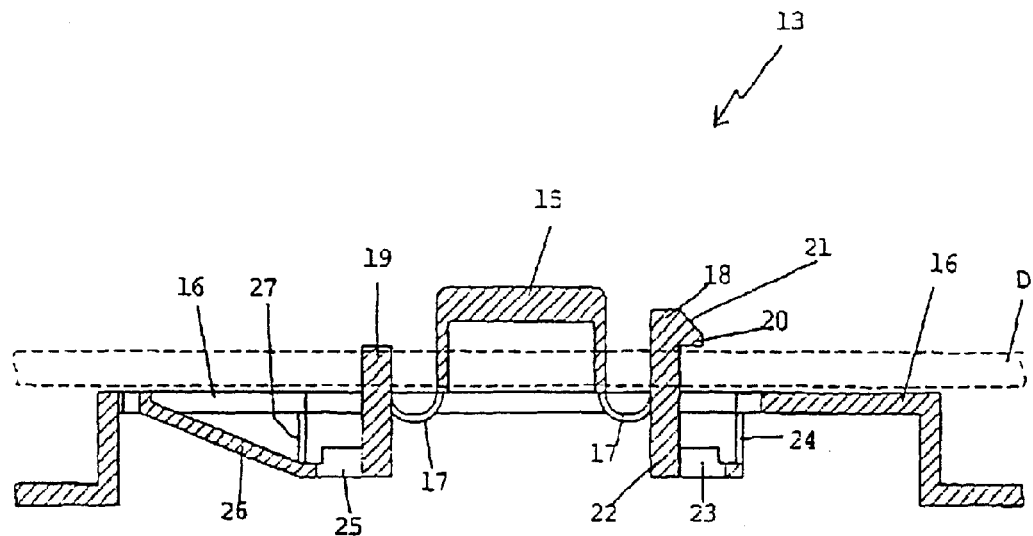
Figure 5B:
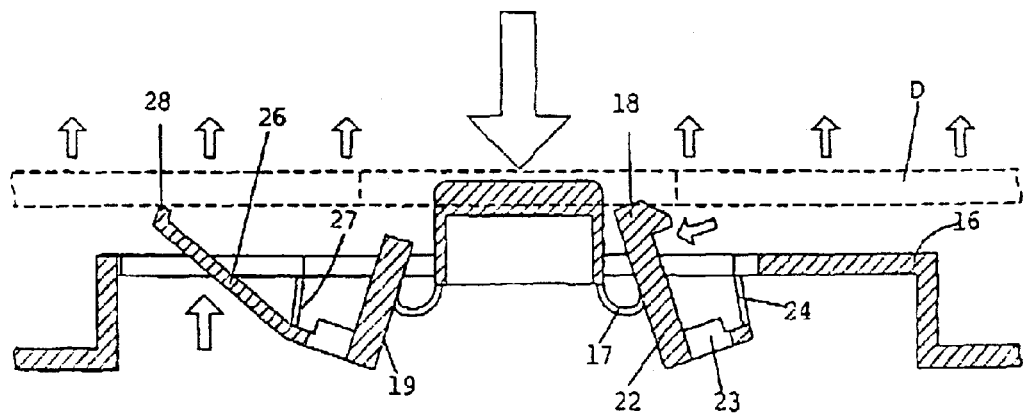

As best shown in FIGS. 4, 5A and 5B, the disc locator 13 includes a central button 15 at the centre of a disc platter 16. The button 15 is formed integrally with the platter 16 during the moulding process of the disc storage case 10. The button 15 has extending from it a plurality of thin flexible inner suspension linkages 17, which in this embodiment, are curved. These linkages are grouped in adjacent pairs as shown in FIG. 4. In the embodiment depicted, there are six pairs of inner suspension linkages and diametrically opposed pairs are connected to a disc latch 18 on the one hand and a disc positioner 19 on the other. There are three disc latches 18 and three disc positioners 19. The disc latches and disc positioners alternate in sequence around the button 15.

Each disc latch 18 includes a finger 20 having a chamfered upper surface 21 upon which the inner edge of the disc D (at its central aperture) bears during attachment of the disc to the locator.

Each latch 18 has a downwardly depending leg (the part to which the inner suspension linkages 17 are attached) from which there extends a pair of feet 23. The leg 22 and feet 23 have a thickness greater than that of the inner suspension linkages 17 and therefore maintain a fixed angular relationship with respect to one another. Each of the feet 23 has a pair of thin flexible outer suspension linkages 24 by which the locator 13 is suspended from the platter 16.

As noted above, diametrically opposite each latch 18 there is a disc positioner 19. Each positioner 19 bears against the inner edge of the disc at its central aperture and is connected to the button 15 by a thin flexible suspension linkage 17 in the same manner as is the leg 22 of the latch 18. The positioner 19 has extending from it via a pair of feet 25 a disc-release lever 26. At the transition between the foot 25 and the release lever 26 there extends an outer suspension linkage 27 by which the locator 13 is also suspended from the platter 16. The lever 26, feet 25 and the positioner 19 are formed of relatively thick plastics material to maintain a fixed angular relationship between the lever 26 and the positioner 19. There is a toe 28 at the remote end of the lever 26 that bears upwardly against the bottom surface of the disc D when the button 15 is depressed as shown in FIG. 5B.

Figure 6A:
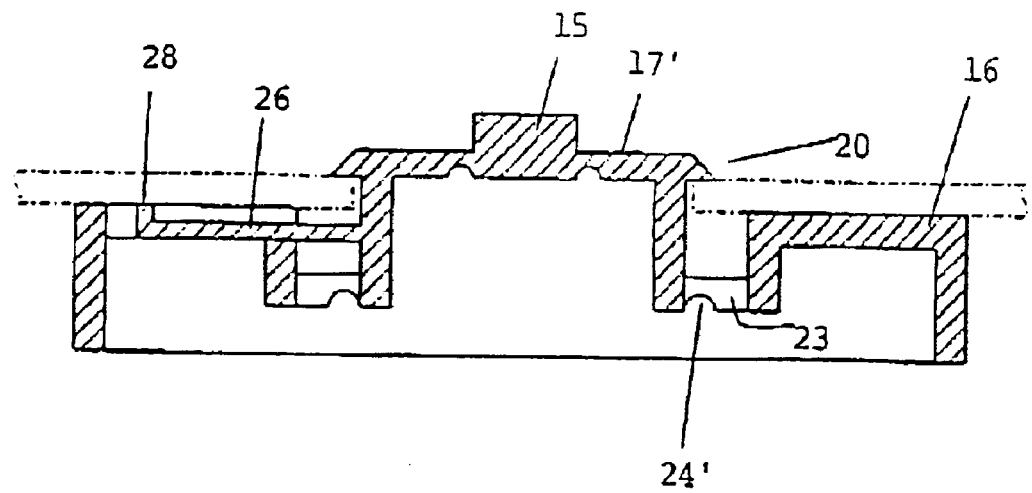
FIGS. 6A and 6B are schematic cross-sectional elevational views of an alternative mechanism (short button embodiment) in disc-retaining and disc-release configurations respectively.
Figure 6B:
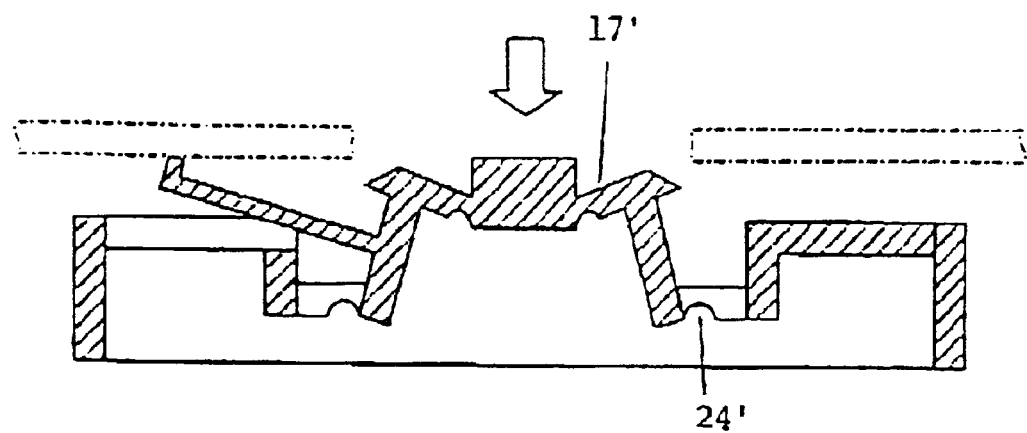
Figure 7A:
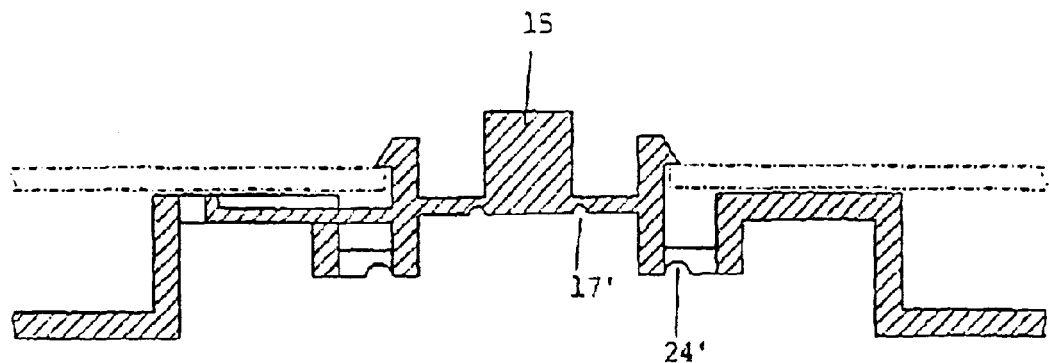
FIGS. 7A and 7B are schematic cross-sectional elevational views of an alternative mechanism (intermediate button embodiment) in disc-retaining and disc-release configurations respectively.
Figure 7B:
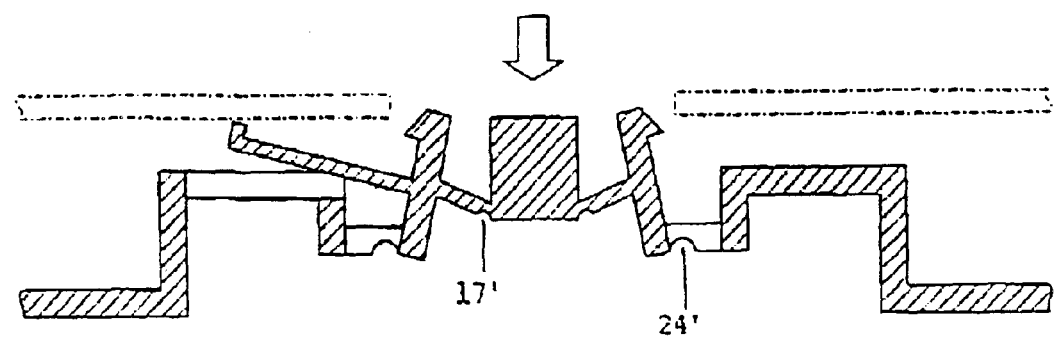
Figure 8A:
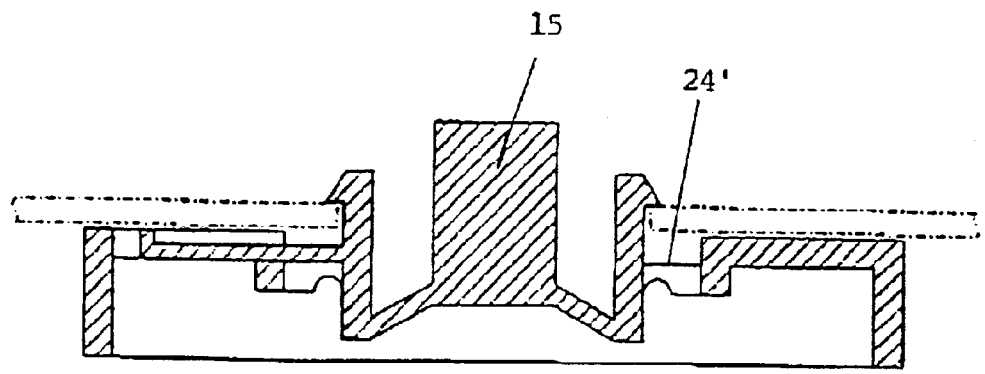
FIGS. 8A and 8B are schematic cross-sectional elevational views of an alternative mechanism (tall button embodiment) in disc-retaining and disc-release configurations respectively.
Figure 8B:
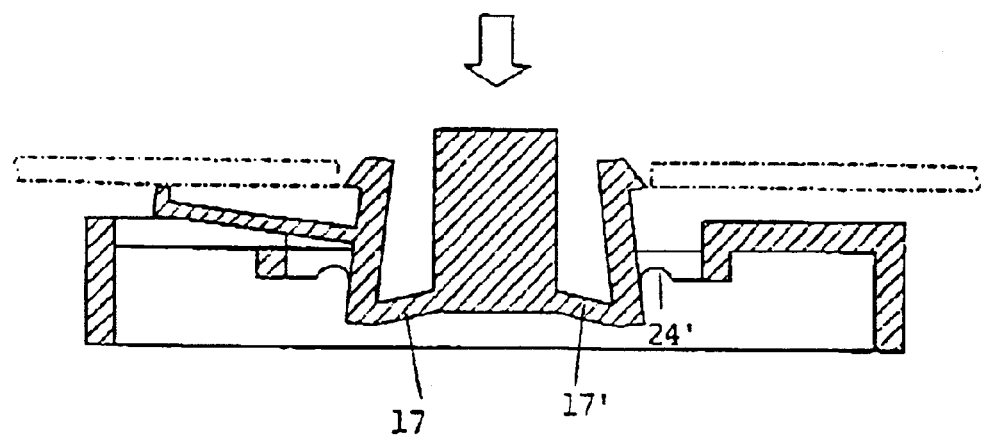

Alternative embodiments of the locator are shown in FIGS. 6 to 8. In these embodiments, instead of having a set of separate linkages 17 and 27, flexibility is provided by thinned sections 17' and 24' respectively. The thinned sections provide flexibility, whereas the relatively thicker sections remain rigid by comparison.

The various embodiments depicted in FIGS. 6 to 8 are functionally the same, but have buttons 15 of differing height, so these will not be described in detail. Suffice to say that each embodiment has inner and outer thinned portions 17' and 24' providing flexibility for operation.

In use, a DVD, VCD or CD disc D is pressed downwardly upon the locator 13 whereupon its inner edge (at the central aperture) rides over the chamfered surface 21 of the latch's finger 20. The flexibility of the suspension linkages 17, 17' and 24, 24' enables the fingers 20 to move inwardly to enable the disc D to be received upon the platter 16. The resilience of the suspension linkages 17, 17' and 24, 24' returns the latch 18 to the position depicted in FIG. 5A. To release the disc D, one presses down upon the button 15 to thereby effect movement of the latches 18 and positioners 19 to the position depicted in FIG. 5B. As a result, the fingers 20 move inwardly to allow the disc D to be released as the toes 28 apply lifting force to the bottom surface of the disc. As the button 15 is depressed, it passes a point of maximum resistance approximately midway between the positions depicted in FIGS. 5A and 5B. That is, the resilient linkages 17 pass a point of maximum compression whereupon the button provides a click feedback feel to the user somewhat like that given by the buttons of many desktop calculators. Upon release of finger pressure to the button 15, the disc D has been released by the locator to allow the disc to be simply lifted away from the case 10.

What is claimed is:

1. A disc locator comprising:
    a platter,
    a button located centrally of the platter,
    a plurality of inner resilient linkages extending from the button,
    a plurality of outer resilient linkages extending from the platter and forming pairs with respective ones of the inner resilient linkages,
    a plurality of latches interposed between the inner and outer resilient linkages of at least some of said inner and outer resilient linkage pairs, each latch comprising a disc-engaging finger for passing through the central aperture of a disc to retain the disc and adapted to move toward the button upon depression of the button,
    a plurality of lifting levers associated with at least some of said inner and outer resilient linkage pairs and adapted to bear upwardly upon a disc to release the disc upon depression of the button.

2. The disc locator of claim 1 wherein the inner resilient linkages are curved and are formed of material thinner than that of the button and platter.

3. The disc locator of claim 1 wherein the outer resilient linkages depend from the platter and are formed of material thinner than that of the button and platter.

4. The disc locator of claim 1 wherein alternative inner and outer resilient linkage pairs are associated with said latches.

5. The disc locator of claim 4 wherein alternative inner and outer resilient linkage pairs are associated with said levers.

6. The disc locator of claim 5 wherein said lever-associated resilient linkage pairs alternate with said latch-associated resilient linkage pairs about the button.

7. The disc locator of claim 1 wherein each latch comprises a leg from which a said inner resilient linkage extends to the button.

8. The disc locator of claim 7 wherein feet extend from the legs and wherein said outer resilient linkages extend from the feet to the platter.

9. The disc locator of claim 8 wherein the respective legs and feet are formed as a rigid unit.

10. The disc locator of claim 8 wherein a pair of feet extend from each leg.

11. The disc locator of claim 5 further comprising a plurality of disc retainers and wherein the inner resilient linkage of each lever-associated linkage pair extends from a respective disc retainer to the button.

12. The disc locator of claim 11 wherein the disc positioner bears against an inner edge of the disc at its central aperture.

13. The disc locator of claim 11 wherein each lever is formed rigidly with a respective disc positioner.

14. A disc storage case having the disc locator of claim 1 formed integrally therewith.

15. The disc storage case having the disc locator of claim 2 formed integrally therewith.

16. The disc storage case having the disc locator of claim 3 formed integrally therewith.

17. The disc storage case having the disc locator of claim 4 formed integrally therewith.

18. The disc storage case having the disc locator of claim 7 formed integrally therewith.

* * * * *